US012804103B2

(12) United States Patent
Noguchi

(10) Patent No.: US 12,804,103 B2
(45) Date of Patent: Nov. 17, 2026

(54) CONFERENCE SUPPORT SYSTEM AND CONFERENCE SUPPORT METHOD

(71) Applicant: HONDA MOTOR CO., LTD., Tokyo (JP)

(72) Inventor: Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 18/626,557

(22) Filed: Apr. 4, 2024

(65) Prior Publication Data

US 2024/0357057 A1 Oct. 24, 2024

(30) Foreign Application Priority Data

Apr. 20, 2023 (JP) ................................. 2023-069528

(51) Int. Cl.

*H04N 7/15* (2006.01)
*B60W 50/14* (2020.01)
*G06Q 10/02* (2012.01)
*G06Q 10/0631* (2023.01)

(52) U.S. Cl.

CPC .............. *H04N 7/15* (2013.01); *B60W 50/14* (2013.01); *G06Q 10/02* (2013.01); *G06Q 10/06311* (2013.01); *B60W 2050/143* (2013.01); *B60W 2050/146* (2013.01)

(58) Field of Classification Search

CPC .. H04N 7/15; B60W 50/14; B60W 2050/143; B60W 2050/146; G06Q 10/02; G06Q 10/06311; H04L 12/1818; H04L 65/403

See application file for complete search history.

(56) References Cited

U.S. PATENT DOCUMENTS

2007/0205257 A1 * 9/2007 Melis ..................... G06Q 10/10
235/375

FOREIGN PATENT DOCUMENTS

| | | | | | |
|---|---|---|---|---|---|
| CN | 215944402 | U | * | 3/2022 | |
| CN | 118301135 | A | * | 7/2024 | .............. H04W 4/44 |
| GB | 2525039 | A | * | 10/2015 | ............. H04N 7/152 |
| JP | H5-11780 | A | | 1/1993 | |
| JP | H0511780 | A | * | 1/1993 | |

* cited by examiner

*Primary Examiner* — Duc Nguyen

*Assistant Examiner* — Carissa A Jones

(74) *Attorney, Agent, or Firm* — Rankin, Hill & Clark LLP

(57) ABSTRACT

A conference support system includes a schedule information collection unit configured to collect conference schedule information including identification information of a scheduled online conference and information about conference time zone, the scheduled online conference being participated by a participant who wishes to participate in the online conference from a mobile entity; a seat determination unit configured to determine, based on the conference schedule information, a seat arrangement for the participant in the mobile entity that the participant boards; and a presentation unit configured to present the determined seat arrangement to the participant when the participant boards the mobile entity.

7 Claims, 7 Drawing Sheets

CONFERENCE SUPPORT SYSTEM AND CONFERENCE SUPPORT METHOD

INCORPORATION BY REFERENCE

The present application claims priority under 35 U.S.C. § 119 to Japanese Patent Application No. 2023-069528 filed on Apr. 20, 2023. The content of the application is incorporated herein by reference in its entirety.

BACKGROUND OF THE INVENTION

Field of the Invention

The present invention relates to a conference support system and a conference support method, for enabling a passenger of a mobile entity to participate in an online conference.

Description of the Related Art

In recent years, there have been increased efforts to provide access to sustainable transportation systems that are considerate of vulnerable people such as elderly persons, handicapped persons, and children, among other traffic participants. To achieve this goal, intensive research and development is underway to further improve traffic safety and convenience through development relating to vehicle comfort.

Japanese Patent Laid-Open No. 5-11780 discloses a speech privacy protection device that prevents a conversation by a rear seat passenger from being leaked to a front seat passenger in a vehicle. This speech privacy protection device outputs a sound, which is opposite in phase to the conversation voice of the rear seat passenger transmitted to the front seat, from a speaker arranged in the front seat to cancel the conversation voice of the rear seat passenger, so that the conversation voice is muted.

In terms of the vehicle comfort, when some passengers among multiple passengers on board the passenger compartment of a vehicle participate in an online conference, a challenge is to prevent conversations in the online conference from being heard by other passengers.

To solve the above-described problem, an object of the prevent invention is to prevent conversations in an online conference held by some passengers from being heard by other passengers in a compartment of a mobile entity. Accordingly, this contributes to development of a sustainable transportation system.

SUMMARY OF THE INVENTION

One aspect of the present invention is a conference support system including: a schedule information collection unit configured to collect conference schedule information including identification information of a scheduled online conference and information about conference time zone wherein the scheduled online conference is participated by a participant who wishes to participate in the online conference from a mobile entity; a seat determination unit configured to determine, based on the conference schedule information, a seat arrangement for the participant in the mobile entity that the participant boards; and a presentation unit configured to present the determined seat arrangement to the participant when the participant boards the mobile entity.

According to another aspect of the present invention, the seat determination unit divides a compartment of the mobile entity into multiple indoor regions, based on the conference schedule information, and determines the seat arrangement so that participants who participate in the same online conference are seated in the same indoor region.

According to another aspect of the present invention, the seat determination unit determines the seat arrangement so that any non-participant who does not participate in any online conference is seated in the same indoor region.

Another aspect of the present invention includes one or more directional speakers provided in a compartment of the mobile entity, and a sound control unit configured to control sound output from the directional speaker to the compartment, wherein the sound control unit controls the sound output from the directional speaker to mute sound transmitted from one indoor region to other indoor regions, in the other indoor regions.

Another aspect of the present invention includes one or more directional speakers provided in a compartment of the mobile entity, and a sound control unit configured to control sound output from the directional speaker to the compartment, wherein the sound control unit controls the sound output from the directional speaker to mute, in one indoor region, sound transmitted from other indoor regions.

According to another aspect of the present invention, the sound control unit controls sound output from the directional speaker to mute, in one indoor region, voice of a person sitting in one seat at a position of a person sitting in another seat, and/or mute voices of persons sitting in other seats at a position of a person sitting in one seat.

According to another aspect of the present invention, the presentation unit presents the determined seat arrangement to the participant, with a speaker or a display device provided in the mobile entity.

Another aspect of the present invention includes a mobile entity information collection unit configured to collect mobile entity information including information about seating capacity, seat layout, and seat availability, of each of mobile entities available for use by participants, and an allocation unit configured to allocate, to each of the participants, a mobile entity that is used when each of the participants participates in the online conference, wherein the allocation unit calculates the number of participants who participate in the same online conference based on the conference schedule information, and allocates a mobile entity to each of the participants who participate in the same online conference based on both the calculated number of participants and the seating capacity, seat layout, or seat availability of each of the mobile entities as indicated in the mobile entity information, the mobile entity being to be used when the participant participates in the same online conference.

Another aspect of the present invention is a conference support method that is executed by a computer of a conference support system that supports participation in an online conference from a mobile entity, the conference support method including steps of: collecting conference schedule information including identification information of a scheduled online conference and information about conference time zone, wherein the scheduled online conference is participated by a participant who wishes to participate in the online conference from the mobile entity; determining a seat arrangement for the participant in the mobile entity that the participant boards, based on the conference schedule information; and presenting the determined seat arrangement to the participant when the participant boards the mobile entity.

Advantageous Effect of Invention

According to the aspect of the present invention, in a compartment of a mobile entity, it is possible to prevent conversations in an online conference held by some passengers from being heard by other passengers.

DETAILED DESCRIPTION OF THE PREFERRED EMBODIMENTS

Hereinafter, an embodiment of the present invention will be described with reference to the accompanying drawings.

[1. Configuration of Conference Support System]

Figure 1:
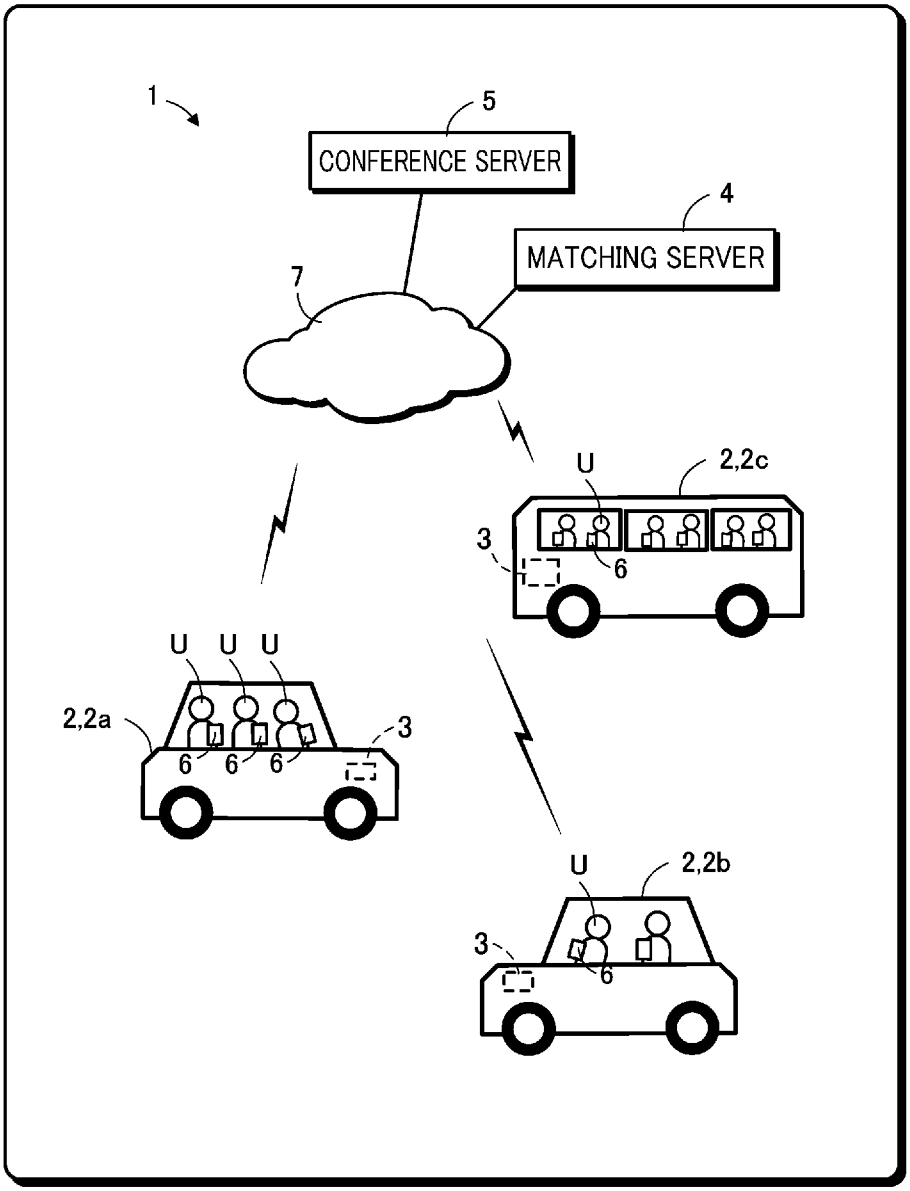
FIG. 1 is a diagram illustrating a configuration of a conference support system according to an embodiment of the present invention.

FIG. 1 is a diagram illustrating a configuration of a conference support system 1 according to an embodiment of the present invention. The conference support system 1 includes one or more vehicles 2 each serving as a mobile entity available for use by a participant U who wishes to participate in an online conference from the mobile entity, and a conference support device 3 mounted on each vehicle 2. Further, the conference support system 1 includes a matching server 4 that determines, for each participant U who wishes to participate in the online conference from the mobile entity, a vehicle 2 that is used when each participant U participates in the online conference.

The example illustrated in FIG. 1 shows, as exemplary vehicles 2 each serving as the mobile entity available for use by the participant U, a passenger car 2*a* with three-row seats, a passenger car 2*b* with two-row seats, and a bus 2*c*. However, the illustrated vehicles are mere examples, and the vehicle 2 can be any vehicle (e.g., a shared car, a taxi, a shared bus, or the like) on which multiple participants U can board.

Further, the mobile entity available for use by the participant U is not limited to a vehicle and can be any mobile entity on which multiple participants U can board.

In addition to terrestrial mobile entities such as passenger cars, buses, taxies, and trains, such mobile entities can be marine mobile entities such as ships and submarines, aerial mobile entities such as aircrafts including Electric Vertical Take-Off and Landing aircrafts (eVTOL) and airships, or space mobile entities such as spacecrafts and artificial satellites.

Each participant U uses his/her own terminal device 6 to participate in an intended online conference, when boarding on the vehicle 2, by communicating with a conference server 5 (computer) that provides online conference functions. In the present embodiment, the terminal device 6 is a portable terminal such as a smartphone, for example. However, the terminal device 6 is not limited to the portable terminal and can be a laptop PC, a tablet PC or the like.

The conference support device 3 of each vehicle 2, the matching server 4, the conference server 5, and the terminal devices 6 are connected via a communication network 7 such as the Internet so that they can communicate with each other.

Each participant U receives, with the terminal device 6, an online conference notification mail, which is delivered from the conference server 5, according to a conventional technique. The holding notification mail may include identification information of the online conference and information about conference time zone (e.g., start time and end time of the conference). In the present embodiment, the above-described identification information of the online conference is, for example, a conference ID. When an organizer of an online conference transmits, to the conference server 5 via a terminal device or the like, a conference setting request that requests participation in the online conference and includes an email address of each participant U, the notification mail is transmitted to the terminal device 6 of each corresponding participant U, according to a conventional technique.

[2. Overview of Conference Support System Operation]

The matching server 4 allocates, to each of multiple participants U who are scheduled to participate in the same online conference, a vehicle 2 that can be used when each participant U participates in this online conference.

In the present embodiment, each participant U transmits conference schedule information to the matching server 4, with his/her terminal device 6, before an online conference in which the participant U participates is held. The conference schedule information may include user identification information identifying the participant U, conference ID or identification information of the online conference in which the participant U plans to participate, and information about conference time zone. In the present embodiment, the user identification information is, for example, a user ID.

Further, the conference schedule information may include information that the participant U wishes to participate in the online conference from a vehicle, information on desired departure point and desired destination for vehicle movement during the online conference, and/or a list of user IDs of one or more other participants U who wish to participate in the same online conference as above from the same vehicle.

The conference support device 3 of each vehicle 2 transmits, to the matching server 4, mobile entity information including the seating capacity, seat layout, and information on usage schedule (usage schedule information 23 described below) of each vehicle 2. The above-described usage schedule information may include travel schedule time zone, traveling route in respective travel schedule time zone, and seat availability information in each traveling route.

The matching server 4 calculates, based on the conference schedule information, the number of participants U who participate in the same online conference. Based on the above-described calculated number of participants and the seating capacity, seat layout, or seat availability of each vehicle 2, indicated by the mobile entity information, the matching server 4 allocates, to each of the above-described participants U who participate in the same online conference, a vehicle 2 that is used when each participant participates in the same online conference. Then, the matching server 4 transmits, to the terminal device 6 of each participant U, information on the above-described allocated vehicle 2 (e.g., identification information such as vehicle number of the vehicle 2, and information on waiting place and waiting time for boarding the vehicle 2). Further, the matching server 4 transmits, to the conference support device 3 of the above-described allocated vehicle 2, matching information including a list of participants U allocated to the vehicle 2, information on waiting place, waiting time, and destination of each participant U for the vehicle 2, conference ID of the online conference and information about conference time zone.

Here, multiple participant groups participating in mutually different online conferences can be allocated to a vehicle 2, depending on the number of seats in the vehicle 2, so that they ride together in the same time zone. Therefore, in the vehicle 2, conference voices of multiple participant groups participating in mutually different online conferences may interfere with each other in a passenger compartment of the vehicle 2. It is desirable to prevent such confusion of conference voices, from the viewpoint of smooth proceeding of each online conference and confidentiality of conference content. Further, since non-participants who do not participate in any online conference can board the vehicle 2, it is preferable to prevent conference voices of participants riding together from reaching the non-participants.

Therefore, in the present embodiment, when participants U boards the vehicle 2, the conference support device 3 of the vehicle 2 divides the passenger compartment into multiple regions (indoor regions) and proposes the seat arrangement of the participants U so that the participants U participating in the same online conference are seated in the same indoor region. As a result, in the conference support system 1, since the seats for the participants attending the same online conference are grouped together in the same indoor region, it is possible to make it difficult for other passengers not related to this conference to hear conference conversations in the online conference.

Further, by controlling sound output from the directional speaker 14 (described below) arranged in the passenger compartment of the vehicle 2, the conference support device 3 mutes sound (including voice) transmitting from one indoor region to other indoor regions, in the other indoor regions. As a result, in the conference support system 1, for each indoor region, voice transmitted from other indoor regions to one indoor region is muted. Therefore, confidentiality of conference conversations in respective indoor regions can be secured between these indoor regions.

[3. Configuration of Vehicle]

The vehicle 2 available for use by each participant U who participates in an online conference will be described with respect to its configuration.

Figure 2:
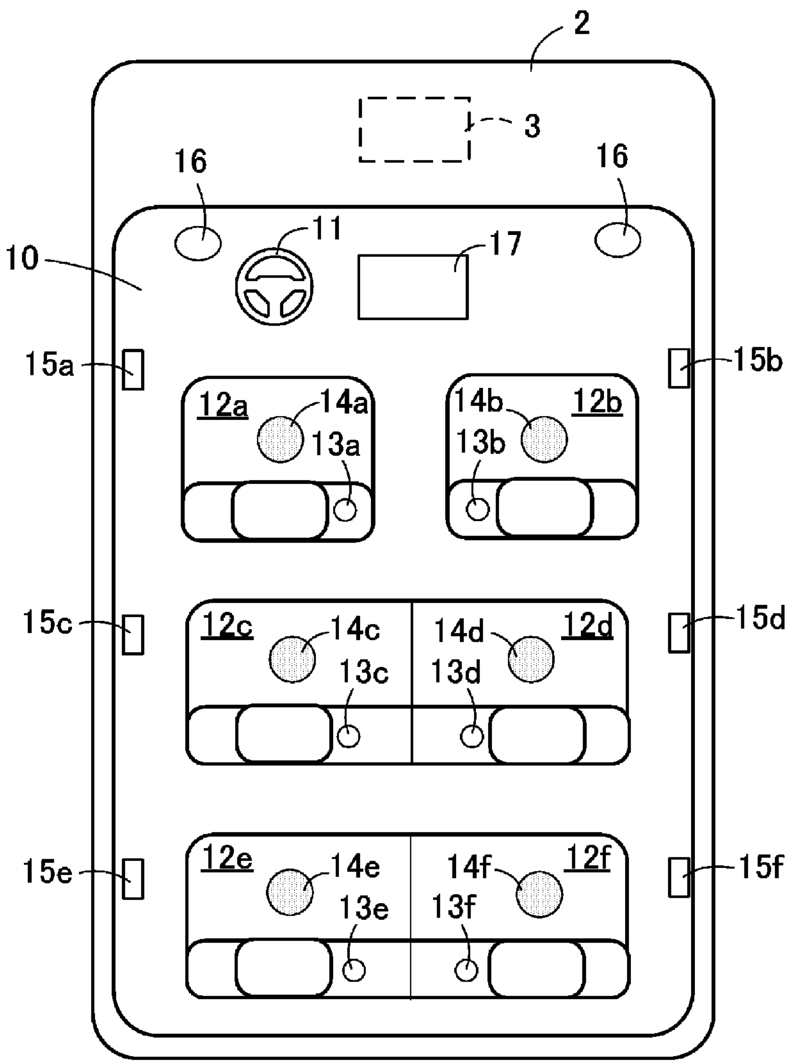
FIG. 2 is a diagram illustrating a configuration of a mobile entity available for use by an online conference participant in the conference support system.

FIG. 2 is a diagram illustrating an exemplary configuration of the vehicle 2. FIG. 2 illustrates, as an example, the configuration of the vehicle 2*a* with three-row seats, though other vehicles 2*b* and 2*c* may be similarly configured.

A driver seat 12*a* on which a driver who operates a steering wheel 11 is seated, a front passenger seat 12*b*, a left-in-second-row seat 12*c*, a right-in-second-row seat 12*d*, a left-in-third-row seat 12*e*, and a right-in-third-row seat 12*f* are arranged in a passenger compartment 10 of the vehicle 2. Hereinafter, the driver seat 12*a*, the front passenger seat 12*b*, the left-in-second-row seat 12*c*, the right-in-second-row seat 12*d*, the left-in-third-row seat 12*e*, and the right-in-third-row seat 12*f* may be collectively referred to as seat 12.

Microphones 13*a*, 13*b*, 13*c*, 13*d*, 13*e*, and 13*f* are provided in the vicinity of headrest at upper portion of respective backrests, in each of the driver seat 12*a*, the front passenger seat 12*b*, the left-in-second-row seat 12*c*, the right-in-second-row seat 12*d*, the left-in-third-row seat 12*e*, and the right-in-third-row seat 12*f*.

Further, directional speakers 14*a*, 14*b*, 14*c*, 14*d*, 14*e*, and 14*f* that output sound toward respective seats 12 are provided on a ceiling surface of the passenger compartment 10, at upper position corresponding to the driver seat 12*a*, the front passenger seat 12*b*, the left-in-second-row seat 12*c*, the right-in-second-row seat 12*d*, the left-in-third-row seat 12*e*, and the right-in-third-row seat 12*f*, respectively.

Further, changeover switches 15*a*, 15*b*, 15*c*, 15*d*, 15*e*, and 15*f* for switching muting operation (described below) of the directional speaker 14 that the conference support device 3 performs are provided at respective positions (e.g., on the side walls of the passenger compartment 10 adjacent to respective seats 12) where these switches can be operated by participants U who are seated on the driver seat 12*a*, the front passenger seat 12*b*, the left-in-second-row seat 12*c*, the right-in-second-row seat 12*d*, the left-in-third-row seat 12*e*, and the right-in-third-row seat 12*f*, respectively.

Further, guidance speakers 16 outputting guidance voice into the passenger compartment 10 are arranged on the left and right sides of the front side in the vehicle 2 (in the upper part of the drawing) in the passenger compartment 10. Further, a display device 17 is provided at a position that can be easily viewed by passengers, for example, at the center of an instrument panel in the vehicle width direction, on the front side of the passenger compartment 10. The display device 17 is, for example, a touch panel.

Hereinafter, the microphones 13*a*, 13*b*, 13*c*, 13*d*, 13*e*, and 13*f* may be collectively referred to as microphone 13. The directional speakers 14*a*, 14*b*, 14*c*, 14*d*, 14*e*, and 14*f* may be collectively referred to as directional speaker 14. Further, the changeover switches 15*a*, 15*b*, 15*c*, 15*d*, 15*e*, and 15*f* may be collectively referred to as changeover switch 15.

[4. Configuration of Conference Support Device]

Figure 3:
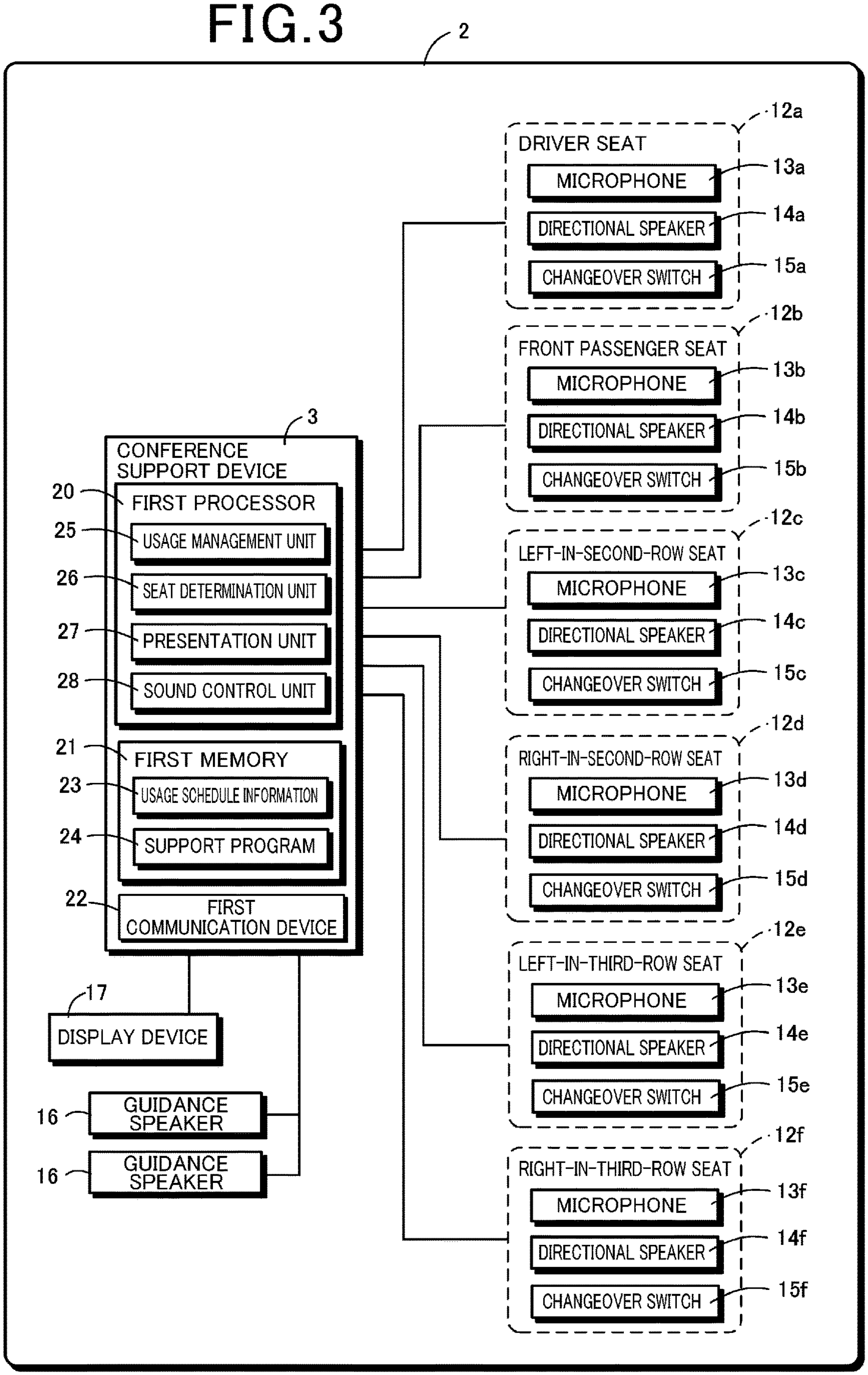
FIG. 3 is a diagram illustrating a configuration of a conference support device mounted on the mobile entity.

FIG. 3 is a diagram illustrating a configuration of the conference support device 3 mounted on the vehicle 2.

The conference support device 3 includes a first processor 20, a first memory 21, and a first communication device 22. The first memory 21 is, for example, configured with a volatile and/or non-volatile semiconductor memory, and/or a hard disk device or the like. The first communication device 22 is a transmitter/receiver that enables the conference support device 3 to wirelessly communicate with external devices (including the matching server 4, the conference server 5, and the terminal device 6) via the communication network 7. Further, the first communication device 22 may include a transceiver for performing near field wireless communication such as Bluetooth (registered trademark) with the terminal device 6 when each participant U boards a vehicle 2.

The first processor 20 is, for example, a computer including a central processing unit (CPU) or the like. The first processor 20 may be configured to include a read only memory (ROM) storing written programs, a random access memory (RAN) temporarily storing data, and the like. Further, the first processor 20 includes, as a functional element or a functional unit, a usage management unit 25, a seat determination unit 26, a presentation unit 27, and a sound control unit 28.

These functional elements provided in the first processor 20 are realized, for example, when the first processor 20, which is the computer, executes a support program 24 stored in the first memory 21. Note that the support program 24 can be stored in any computer-readable storage medium. Alternatively, the all or part of the above-described functional elements provided in the first processor 20 can be configured with a hardware including one or more electronic circuit components, respectively.

The usage management unit 25 manages information on usage schedule of the vehicle 2. Specifically, the usage management unit 25 manages the usage schedule information 23 stored in the first memory 21. The usage schedule information 23 stores, as information on usage schedule, travel schedule time zones of the vehicle 2, traveling routes in respective travel schedule time zones, and seat availability information in each traveling route.

The above-described information on usage schedule can be input, for example, by an administrator of the vehicle 2, from the display device 17, which is the touch panel. In response to an input of any information relating to the above-described usage schedule, the usage management unit 25 updates the information on usage schedule included in the usage schedule information 23, based on the input information. Further, in response to reception of the matching information from the matching server 4, the usage management unit 25 stores the received matching information in the usage schedule information 23. Further, based on the number of participants U allocated to the vehicle 2 that is included in the above-described received matching information, etc., the usage management unit 25 updates the seat availability information, etc. that is part of the usage schedule information 23.

Further, the usage management unit 25 transmits, to the matching server 4, mobile entity information including the seating capacity, seat layout, and the above-described information on usage schedule, of the vehicle 2. For example, when the usage management unit 25 has updated the information on usage schedule included in the usage schedule information 23, the usage management unit 25 transmits, to the matching server 4, the mobile entity information including the information of usage schedule, based on the usage schedule information 23.

Further, the usage management unit 25 deletes, from the usage schedule information 23, matching information for online conferences whose conference time zones have passed, among the matching information stored in the usage schedule information 23.

The seat determination unit 26 determines the seat arrangement of each participant U in the vehicle 2, based on the conference schedule information collected by the matching server 4. Specifically, based on matching information that the matching server 4 has generated based on the conference schedule information, the seat determination unit 26 divides the passenger compartment 10 of the vehicle 2 into multiple indoor regions, and determines the seat arrangement so that participants U who participate in the same online conference are seated in the same indoor region.

Figure 4:
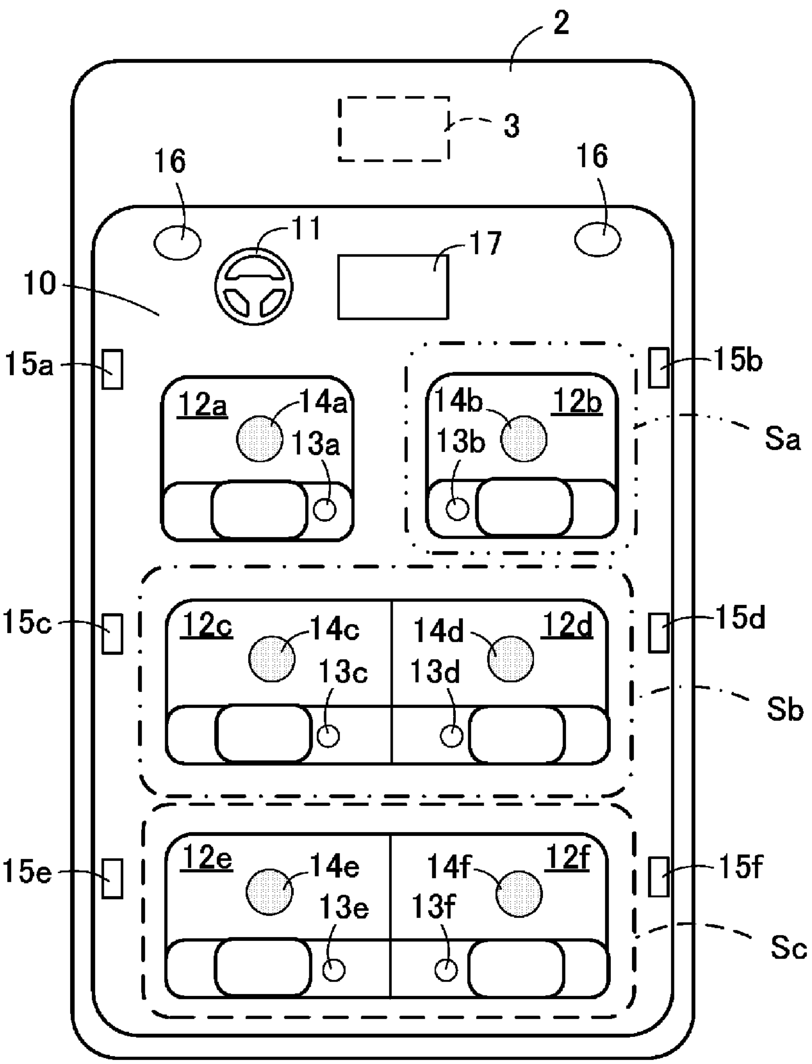
FIG. 4 is a diagram illustrating an exemplary seat arrangement in the mobile entity that the conference support device determines.

FIG. 4 is a diagram illustrating an exemplary seat arrangement that the seat determination unit 26 determines. The illustrated seat arrangement is an example in a case where participants U who participate in three different online conferences whose conference IDs are M100*a*, M100*b*, and M100*c*, respectively, board the vehicle 2. Specifically, for example, one participant U participates in the online conference with the conference ID M100*a*, two participants U participate in the online conference with the conference ID M100*b*, and two participants U participate in the online conference with the conference ID M100*c*. The seat determination unit 26 acquires, from the above-described matching information, information on the number of participants U who participate in respective online conferences identified with their conference IDs.

Based on the above-described information, the seat determination unit 26 divides the passenger compartment 10 into one indoor region Sa including one seat 12 and two indoor regions Sb and Sb each including two seats 12 because the number of the participants U who participate in the online conferences whose conference IDs are M100*a*, M100*b*, and M100*c*, is one, two, and two, respectively. According to the illustrated example, the seat determination unit 26 divides the passenger compartment 10 in such a manner that the indoor region Sa includes the front passenger seat 12*b*, the indoor region Sb includes the left-in-second-row seat 12*c* and the right-in-second-row seat 12*d*, and the indoor region Sc includes the left-in-third-row seat 12*e* and the right-in-third-row seat 12*f*.

Then, the seat determination unit 26 allocates the front passenger seat 12*b* in the indoor region Sa to one participant U who participates in the online conference with the conference ID M100*a*, and allocates the left-in-second-row seat 12*c* and the right-in-second-row seat 12*d* in the indoor region Sb to two participants U who participate in the online conference with conference ID M100*b*. Further, the seat determination unit 26 allocates the left-in-third-row seat 12*e* and the right-in-third-row seat 12*f* in the indoor region Sc to two participants U who participate in the online conference with of conference ID M100*c*.

Note that each indoor region may be a single unit of space (an undivided space) within the passenger compartment 10, and is not limited to a region extending in the width direction of the vehicle 2 like the indoor regions Sb and Sc. For example, the indoor region may be a region having an arbitrary shape extending in width direction and/or traveling direction of the vehicle 2. Further, if there is no need for a person sitting in the driver seat 12*a* to drive during the online conference (for example, when the vehicle is automatically operated or stopped during the online conference), then the seat arrangement may be determined in such a manner that an indoor region including the driver seat 12*a* is provided so that the participant U can be seated in the driver seat 12*a*.

In addition, when multiple non-participants who do not participate in any online conference board the vehicle 2, the seat determination unit 26 may determine the seat arrangement in such a manner that these multiple non-participants are seated in the same indoor region. For example, the administrator of the vehicle 2 can input a schedule for non-participants to board the vehicle 2, to the conference support device 3, in advance, using the display device 17, which is the touch panel. For example, the usage management unit 25 may store the above-described input information on the schedule for non-participants to board, as part of the usage schedule information 23, in the first memory 21.

The presentation unit 27 presents, to a participant U, the seat arrangement for this participant U determined by the seat determination unit 26, when the participant U boards the vehicle 2. For example, the presentation unit 27 presents the above-described seat arrangement for the participant U, with the guidance speakers 16 or the display device 17 provided in the vehicle 2. As a result, the seat arrangement determined based on the conference schedule information can be easily and reliably transmitted to each participant who boards the vehicle 2.

The sound control unit 28 controls sound output from the directional speaker 14 into the passenger compartment 10 to perform muting operation in the passenger compartment 10. As the above-described muting operation, the sound control unit 28 controls the sound output from the directional speaker 14 to mute sound transmitted from one indoor region to other indoor regions, which are divided by the seat determination unit 26, in the other indoor regions. The above-described sound transmitted from one indoor region to the other indoor regions is, for example, conference voices of participants U, who are seated in one indoor region, in an online conference using their terminal devices 6.

Specifically, the sound control unit 28 acquires the sound in one indoor region (hereinafter, referred to as regional voice) with the microphone 13 provided in the indoor region, and in order to mute the above-described regional voice outputting from the microphone 13 in other indoor regions, outputs cancel sound for regional voice from the directional speaker 14 provided in other indoor regions. The above-described cancel sound may be, for example, sound opposite in phase to the voice waveform of the regional voice propagating within other indoor regions.

For example, in the example illustrated in FIG. 4, the sound control unit 28 mutes, in indoor region Sc, the sound transmitted from the indoor region Sb to the left-in-third-row seat 12*e* in the indoor region Sc, by controlling the sound output from the directional speakers 14*e* and 14*f* provided in the indoor region Sc. Specifically, the sound control unit 28 acquires conference voices generated in the left-in-second-row seat 12*c* and the right-in-second-row seat 12*d* in the indoor region Sb, with the microphones 13*c* and 13*d* provided in the left-in-second-row seat 12*c* and the right-in-second-row seat 12*d*, respectively.

Then, the sound control unit 28 causes the directional speaker 14*e* of the left-in-third-row seat 12*e* to output cancel sound for the above-described conference voices so that the above-described acquired conference voices are not heard from the microphone 13*e* of the left-in-third-row seat 12*e* in the indoor region Sc. Further, the sound control unit 28 causes the directional speaker 14*f* of the right-in-third-row seat 12*f* to output cancel sound for the above-described conference voices so that the above-described acquired conference voices are not heard from the microphone 13*f* of the right-in-third-row seat 12*f* in the indoor region Sc.

Further, as a muting operation, the sound control unit 28 may also control the sound output from directional speaker 14 to mute sound transmitted from other indoor regions, in one indoor region. For example, in the example of FIG. 4, the sound control unit 28 can mute, in the indoor region Sc, the sound transmitted from the indoor regions Sa and Sb to the indoor region Sc by controlling the sound output from the directional speakers 14*e* and 14*f* provided for the left-in-third-row seat 12*e* and the right-in-third-row seat 12*f* in the indoor region Sc.

Further, as a muting operation, the sound control unit 28 controls the sound output from the directional speaker 14, in one indoor region, to mute voice of a person sitting in one seat 12, at the position of a person sitting in another seat 12, and/or mute voices of persons sitting in other seats 12, at the position of a person sitting in one seat 12. Here, the above-described person may be either a participant U or a non-participant. As a result, even in a case where one participant among multiple participants who are seated in one indoor region to participate in the same online conference responds to a telephone call during the conference, it is possible to prevent other participants from hearing a conversation responding to this telephone call. Similarly, it is possible to prevent other non-participants from hearing calling voice of one non-participant.

For example, a person sitting in one seat 12 can operate the changeover switch 15 provided near this seat 12 to instruct the sound control unit 28 to control the directional speaker 14 to mute voice of the person sitting in this seat 12 at the position of a person sitting in another seat 12, and/or mute voice of each person sitting in other seats 12 at the position of the person sitting in the above-described one seat 12.

[5. Configuration of Matching Server]

Figure 5:
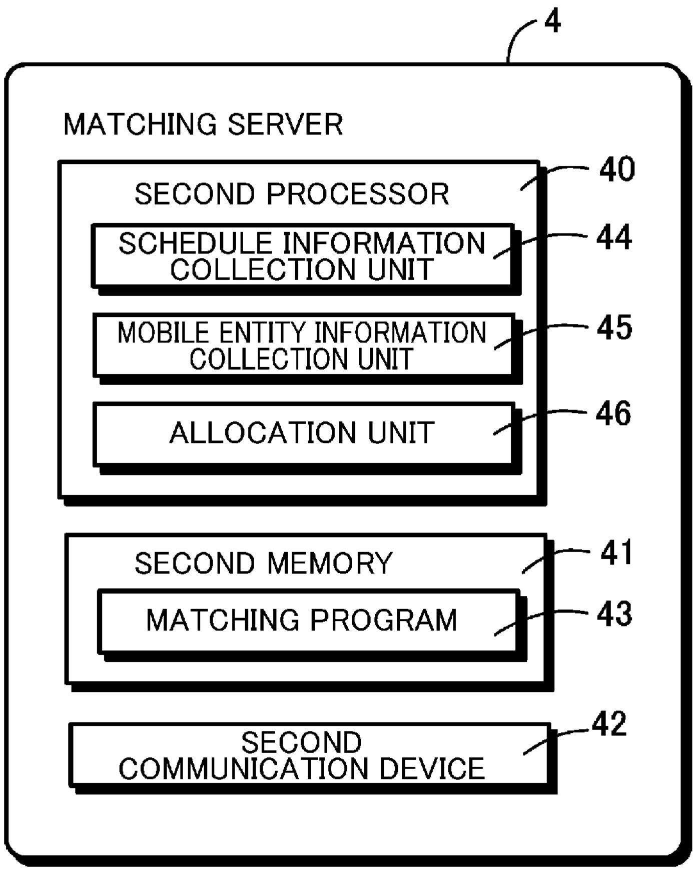
FIG. 5 is a diagram illustrating a configuration of a matching server.

FIG. 5 is a diagram illustrating a configuration of the matching server 4.

The matching server 4 includes a second processor 40, a second memory 41, and a second communication device 42. The second memory 41 is, for example, configured with a volatile and/or non-volatile semiconductor memory, and/or a hard disk device or the like. The second communication device 42 is a transmitter/receiver that enables the matching server 4 to wirelessly communicate with external devices via the communication network 7.

The second processor 40 is, for example, a computer including a CPU or the like. The first processor 20 may be configured to include a ROM storing written programs, a RAM temporarily storing data, and the like. Further, the second processor 40 includes, as a functional element or a functional unit, a schedule information collection unit 44, a mobile entity information collection unit 45, and an allocation unit 46.

These functional elements provided in the second processor 40 are realized, for example, when the second processor 40, which is a computer, executes a matching program 43 stored in the second memory 41. Note that the matching program 43 can be stored in any computer-readable storage medium. Alternatively, the all or part of the above-described functional elements provided in the second processor 40 can be configured with a hardware including one or more electronic circuit components, respectively.

The schedule information collection unit 44 collects conference schedule information of a participant U who wishes to participate in an online conference from a mobile entity. The conference schedule information can be collected from the terminal device 6 of the participant U. Being required to schedule to participate in an online conference, the participant U transmits, to the matching server 4, conference schedule information about this online conference, with the terminal device 6.

As described above, the conference schedule information includes user ID identifying the participant U, conference ID of an online conference in which the participant U plans to participate, and information about conference time zone. Further, the conference schedule information may include information that the participant U wishes to participate in the online conference from a vehicle, information on desired departure point and desired destination for vehicle movement during the online conference, and/or a list of user IDs of one or more other participants U who wish to participate in the same online conference as above from the same vehicle.

The mobile entity information collection unit 45 collects mobile entity information about each vehicle 2 available for use by the participant U. The mobile entity information is transmitted from the conference support device 3 of each vehicle 2 to the matching server 4. As described above, the mobile entity information includes the seating capacity, seat layout, and usage schedule information of each vehicle 2.

The allocation unit 46 allocates, based on the conference schedule information and the mobile entity information, a vehicle 2 that is used when each participant U participates in the online conference, to each participant U, and generates matching information. Specifically, the allocation unit 46 calculates the number of participants U who participate in the same online conference based on the conference schedule information. Then, based on the above-described calculated number of participants as well as the seating capacity, seat layout, or seat availability of each vehicle 2 indicated by the mobile entity information, the allocation unit 46 allocates, to the above-described participant U who participates in the same online conference, a vehicle 2 to be used when each participant U participates in the same online conference. For example, the allocation unit 46 allocates all participants U participating in the same online conference to a single vehicle 2.

Alternatively, the allocation unit 46 may allocate multiple vehicles 2 to participants U participating in the same online conference so that they separately ride the multiple vehicles 2. For example, the allocation unit 46 may group the participants U participating in the above-described same online conference into multiple small groups and allocate a different vehicle 2 to each small group. The allocation unit 46 may perform the above-described grouping based on information on desired departure point and desired destination of each participant U and/or information on a list of user IDs of one or more other participants U wishing to participate from the same vehicle, included in the conference schedule information.

As a result, the conference support system 1 can avoid crowding of participants U in a specific vehicle 2 (for example, by equalizing a boarding rate (i.e., ratio of the number of participants U to the seating capacity) of participants U in each vehicle 2), thereby easily preventing leakage of conference conversations in each vehicle 2.

The allocation unit 46 transmits, to the terminal device 6 of each participant U, information about the vehicle 2 allocated to this participant U, for example, by electronic mail. The above-described information about the vehicle 2 may include information for identifying the vehicle 2 such as vehicle type or vehicle number, as well as information on waiting place and waiting time for boarding the vehicle 2, and the like.

Further, the allocation unit 46 transmits, to the conference support device 3 of the vehicle 2 allocated based on the conference schedule information, matching information including the conference schedule information (including conference ID of the online conference and information about conference time zone), the list of participants U allocated to the vehicle 2 (e.g., list of user IDs), and the information on the waiting place, waiting time and destination of each participant U for the vehicle 2.

[6. Processing in Conference Support System]

Next, a processing procedure of a conference support method that the computers of the conference support system 1 cooperatively execute will be described. Here, the computers of the conference support system 1 include the first processor 20 of the conference support device 3 mounted on the vehicle 2 and the second processor 40 of the matching server 4. The conference support method includes matching processing that the second processor 40 of the matching server 4 executes and conference support processing that the first processor 20 of the conference support device 3 executes.

First, the matching processing will be described with reference to a flow diagram illustrated in FIG. 6. The matching processing illustrated in FIG. 6 starts upon power on of the matching server 4 and is repetitively executed thereafter.

Upon starting the processing, first, the schedule information collection unit 44 of the matching server 4 determines whether the conference schedule information has been received (S100). As described above, being required to schedule to participate in an online conference, each participant U transmits the conference schedule information, with the terminal device 6, to the matching server 4.

Upon receiving the conference schedule information (YES at S100), the schedule information collection unit 44 stores the received conference schedule information in the second memory 41 (S102). Next, the mobile entity information collection unit 45 determines whether the mobile entity information is received from any vehicle 2 (S104).

Upon receiving the mobile entity information (YES at S104), the mobile entity information collection unit 45 stores the received mobile entity information in the second memory 41 (S106). Next, the allocation unit 46 refers to the conference schedule information stored in the second memory 41, and determines whether there is any online conference (hereinafter, referred to as target conference) starting within a predetermined time from the present time (e.g., within three days) (S108).

Then, if there is an online conference (target conference) starting within the predetermined time (YES at S108), the allocation unit 46 generates matching information by allocating a vehicle 2 to the participant U of the target conference, based on the mobile entity information and the conference schedule information stored in the second memory 41 (S110). Subsequently, the allocation unit 46 transmits information about the above-described allocated vehicle 2 to the terminal device 6 of the corresponding participant U, and also transmits the above-described generated matching information to the above-described allocated vehicle 2, and then ends the processing.

On the other hand, if no conference schedule information is received at step S100 (NO at S100), the schedule information collection unit 44 proceeds to step S104. Further, if no mobile entity information is received in step S104 (NO at S104), the mobile entity information collection unit 45 proceeds to step S108.

Further, on the other hand, at step S108, if there is no online conference (target conference) starting within the predetermined time (NO at S108), then the allocation unit 46 ends the processing.

Figure 7:
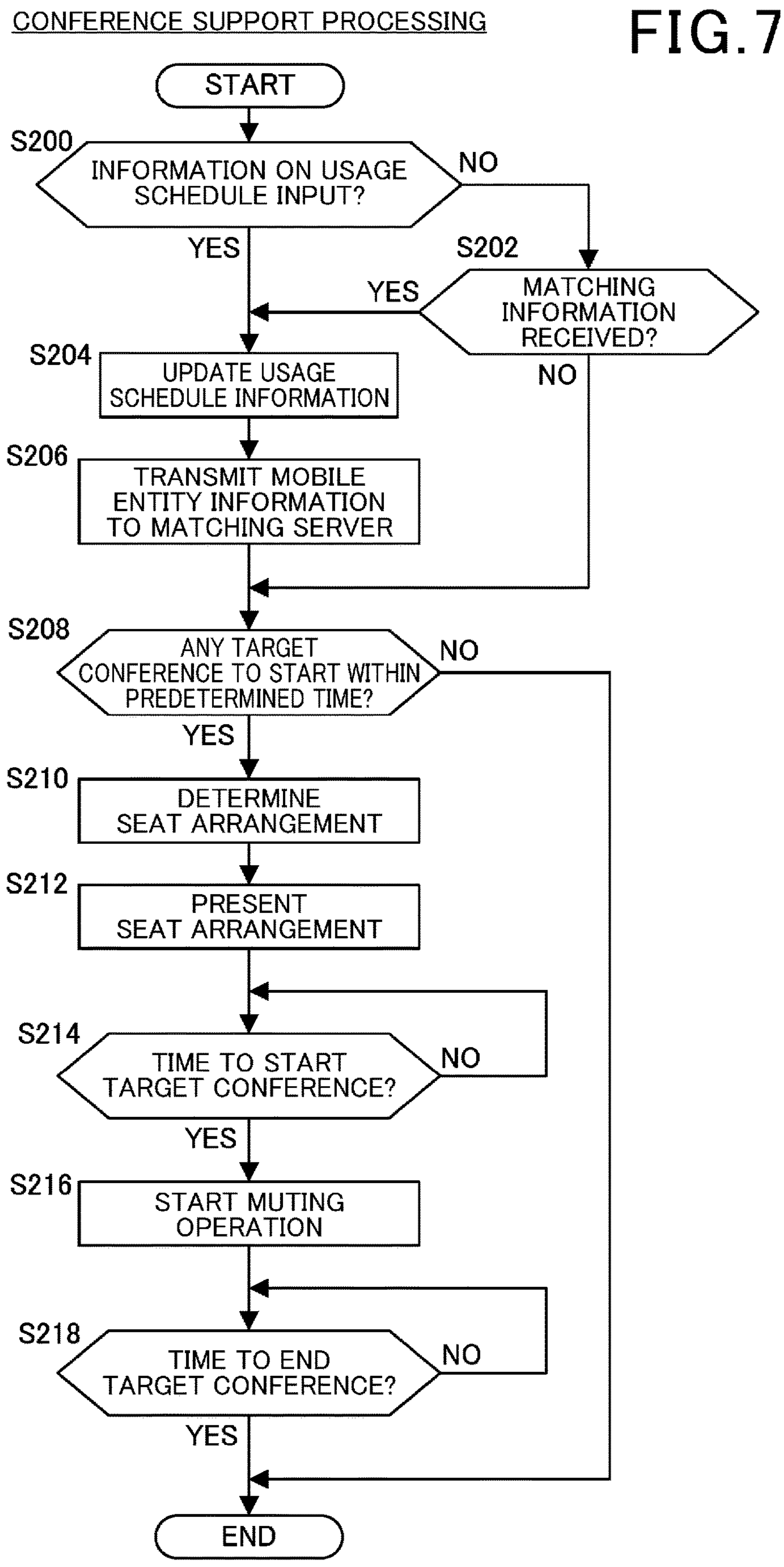
FIG. 7 is a flow diagram illustrating a procedure of conference support processing configuring the conference support method, which the conference support device executes.

Next, the conference support processing that the first processor 20 of the conference support device 3 executes will be described with reference to a flow diagram illustrated in FIG. 7. The conference support processing illustrated in FIG. 7 starts upon power on of the conference support device 3 and is repetitively executed thereafter.

Upon starting the processing, first, the usage management unit 25 of the conference support device 3 determines whether information on usage schedule of the vehicle 2 has been input with the display device 17, which is the touch panel (S200). If there is no input of information on usage schedule (NO at S200), then the usage management unit 25 determines whether matching information has been received from the matching server 4 (S202).

Then, if there is an input of the information on usage schedule (YES at S200) or reception of the matching information (YES at S202), the usage management unit 25 updates the usage schedule information 23 stored in the second memory 41 (S204). At this time, the usage management unit 25 stores the above-described received matching information in the usage schedule information 23. Further, the usage management unit 25 generates mobile entity information based on the updated usage schedule information 23 and transmits the generated mobile entity information to the matching server 4 (S206).

Next, the seat determination unit 26 refers to the matching information stored in the usage schedule information 23, and determines whether there is any online conference (hereinafter, referred to as target conference) starting within a predetermined time (e.g., within one day) from the present time (S208). If there is an online conference (target conference) starting within the predetermined time (YES at S208), then the seat determination unit 26 determines a seat arrangement for the participant U who participates in the target conference from the vehicle 2 (S210). At this time, the seat determination unit 26 may acquire information about a non-participant who plans to board the vehicle 2 in the conference time zone of the target conference, which is included in the usage schedule information 23, and determine the above-described seat arrangement in consideration of the seat for this non-participant.

Next, when the participant U of the target conference boards the vehicle 2, the presentation unit 27 presents, to the participant U, the above-described determined seat arrangement (S212). For example, each time a person boards the vehicle 2 within a predetermined time (e.g., within two hours) before the target conference start time, the presentation unit 27 can present the above-described determined seat arrangement for the person. This seat arrangement can be presented by a voice message from the guidance speakers 16 or a screen display on the display device 17, as described above.

Next, the sound control unit 28 refers to the matching information stored in the usage schedule information 23, and determines whether the target conference has started (S214). Then, at step S212, if the target conference has not yet started (NO at S214), the sound control unit 28 returns to step S214 and repeats the processing to wait for the target conference to start.

On the other hand, if the target conference has started (YES at S214), the sound control unit 28 starts the muting operations between indoor regions (S216). Next, the sound control unit 28 refers to the matching information stored in the usage schedule information 23, and determines whether the target conference has ended (S218). If the target conference has not yet ended (NO at S218), then the sound control unit 28 returns to step S216 and repeats the processing to wait for the target conference to end. On the other hand, if the target conference has ended (YES at S218), the sound control unit 28 ends the processing.

On the other hand, in step S208, if there is no online conference (target conference) starting within the predetermined time (NO at S208), the seat determination unit 26 ends the processing.

Figure 6:
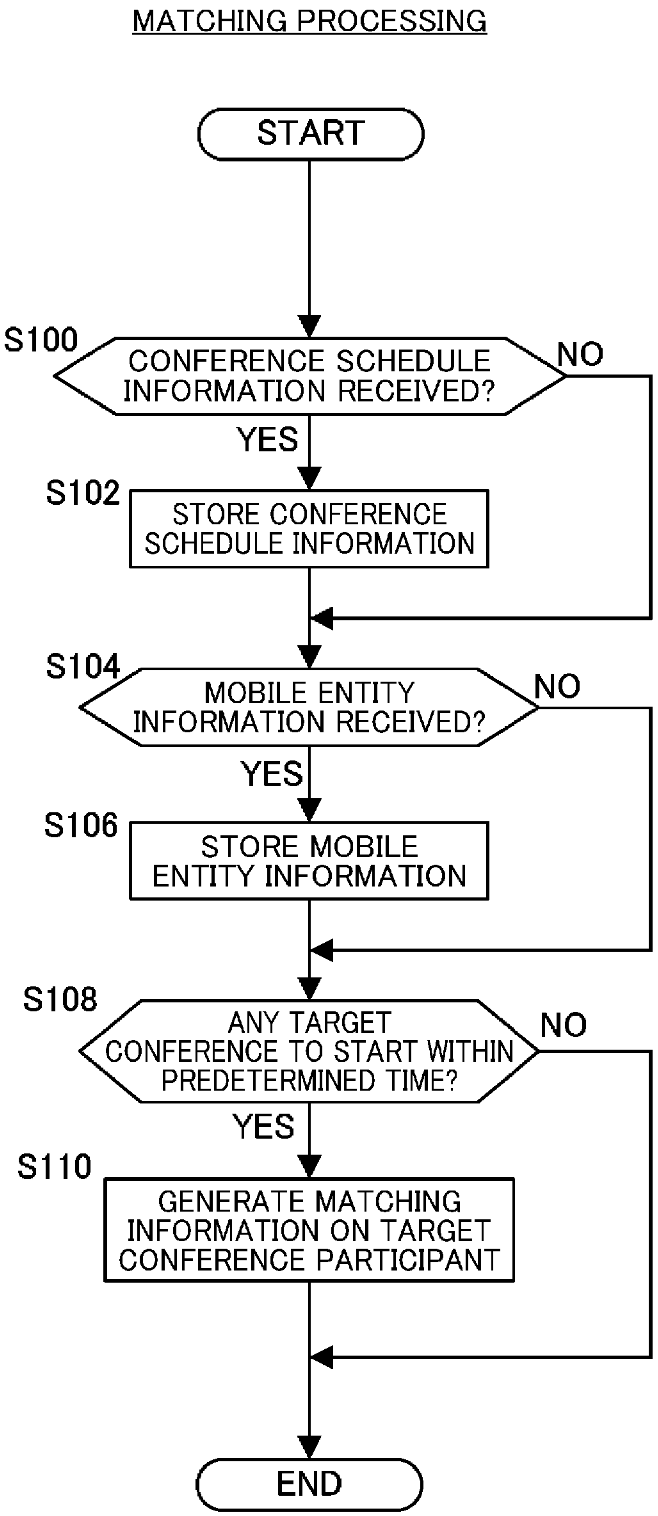
FIG. 6 is a flow diagram illustrating a procedure of matching processing configuring a conference support method, which the matching server executes.

Here, steps S100 and S102 in the matching processing illustrated in FIG. 6 correspond to a schedule information collection step in the present disclosure. Further, steps S210 and S212 in the conference support processing illustrated in FIG. 7 correspond to a seat determination step and a presentation step, respectively, in the present disclosure.

Note that the present invention is not limited to the configuration of the above-described embodiment, and can be implemented in various ways without departing from the scope of the invention.

[7. Configuration Supported by the Above-Described Embodiment]

The above-described embodiment supports the following configurations.

(Configuration 1) A conference support system including: a schedule information collection unit configured to collect conference schedule information including identification information of a scheduled online conference and information about conference time zone, wherein the scheduled online conference is participated by a participant who wishes to participate in the online conference from a mobile entity; a seat determination unit configured to determine, based on the conference schedule information, a seat arrangement for the participant in the mobile entity that the participant boards; and a presentation unit configured to present the determined seat arrangement to the participant when the participant boards the mobile entity.

According to the conference support system of configuration 1, since the seat arrangement in the mobile entity is determined and presented based on the conference schedule information, seats for participants attending in the same online conference can be grouped together in one region of the mobile entity compartment, for example, thereby making it difficult for other passengers to hear conference conversations.

(Configuration 2) The conference support system according to configuration 1, in which the seat determination unit divides a compartment of the mobile entity into multiple indoor regions, based on the conference schedule information, and determines the seat arrangement so that participants who participate in the same online conference are seated in the same indoor region.

According to the conference support system of configuration 2, seats for participants attending in the same online conference are grouped together in the same indoor region for each online conference. Therefore, it is possible to prevent conference conversations of multiple online conferences from becoming complicated in the mobile entity compartment.

(Configuration 3) The conference support system according to configuration 2, in which the seat determination unit determines the seat arrangement so that any non-participant who does not participate in any online conference is seated in the same indoor region.

According to the conference support system of configuration 3, the non-participants who do not participate in any online conference are grouped together in one region of the mobile entity. Therefore, for example, seats for all the non-participants can be positioned away from online conference participants so that the non-participants are less likely to be bothered by conference conversations.

(Configuration 4) The conference support system according to configuration 2 or 3, further including: one or more directional speakers provided in the compartment of the mobile entity; and a sound control unit configured to control sound output from the directional speaker into the compartment, wherein the sound control unit controls the sound output from the directional speaker to mute sound transmitted from one indoor region to other indoor regions, in the other indoor regions.

According to the conference support system of configuration 4, for each indoor region, voice transmitted from other indoor regions to one indoor region is muted. Therefore, confidentiality of conference conversations in respective indoor regions can be secured between these indoor regions.

(Configuration 5) The conference support system according to any one of configuration 2 to 4, further including one or more directional speakers provided in the compartment of the mobile entity, and a sound control unit configured to control sound output from the directional speaker into the compartment, wherein the sound control unit controls the sound output from the directional speaker to mute, in one indoor region, sound transmitted from other indoor regions.

According to the conference support system of configuration 5, confidentiality of conference conversations in respective indoor regions can be secured between these indoor regions.

(Configuration 6) The conference support system according to configuration 4 or 5, wherein the sound control unit controls sound output from the directional speaker to mute, in one indoor region, voice of a person sitting in one seat at a position of a person sitting in another seat, and/or mute voices of persons sitting in other seats at a position of a person sitting in one seat.

According to the conference support system of configuration 6, for example, even in a case where one participant among multiple participants who are seated in one indoor region to participate in the same online conference responds to a telephone call during the conference, it is possible to prevent other participants from hearing a conversation responding to this telephone call.

(Configuration 7) The conference support system according to any one of configurations 1 to 6, wherein the presentation unit presents the determined seat arrangement to the participant, with a speaker or a display device provided in the mobile entity.

According to the conference support system of configuration 7, the seat arrangement determined based on the conference schedule information can be easily and reliably transmitted to the participant who boards the mobile entity.

(Configuration 8) The conference support system according to any one of configurations 1 to 7, further including a mobile entity information collection unit configured to collect mobile entity information including information about seating capacity, seat layout, and seat availability, of each of mobile entities available for use by the participants; and an allocation unit configured to allocate, to each of the participants, a mobile entity that is used when each of the participants participates in the online conference, wherein the allocation unit calculates the number of participants who participate in the same online conference based on the conference schedule information, and allocates a mobile entity to each of the participants who participate in the same online conference based on both the calculated number of participants and the seating capacity, seat layout, or seat availability of each of the mobile entities as indicated in the mobile entity information, the mobile entity being to be used when the participant participates in the same online conference.

According to the conference support system of configuration 8, the mobile entity to be used by a participant when participating in the conference is allocated to each of participants participating in the same online conference, based on the conference schedule information and the mobile entity information. Therefore, for example, it is possible to avoid crowding of participants in a specific mobile entity, thereby easily preventing leakage of conference conversations in each mobile entity.

(Configuration 9) A conference support method that is executed by a computer of a conference support system that supports participation in an online conference from a mobile entity, the conference support method including steps of: collecting conference schedule information including identification information of a scheduled online conference and information about conference time zone, wherein the scheduled online conference is participated by a participant who wishes to participate in the online conference from the mobile entity; determining, based on the conference schedule information, a seat arrangement for the participant in the mobile entity that the participant boards; and presenting the determined seat arrangement to the participant when the participant boards the mobile entity.

According to the conference support method of configuration 9, since the seat arrangement in the mobile entity is determined and presented based on the conference schedule information, seats for participants attending in the same online conference can be grouped together in one region of the mobile entity compartment, for example, thereby making it difficult for other passengers to hear conference conversations.

REFERENCE SIGNS LIST

1 . . . conference support system
2, 2*a*, 2*b*, 2*c* . . . vehicle (mobile entity)
3 . . . conference support device
4 . . . matching server
5 . . . conference server
6 . . . terminal device
7 . . . communication network
10 . . . passenger compartment
11 . . . steering wheel
12 . . . seat
12*a* . . . driver seat
12*b* . . . front passenger seat
12*c* . . . left-in-second-row seat
12*d* . . . right-in-second-row seat
12*e* . . . left-in-third-row seat
12*f* . . . right-in-third-row seat
13, 13*a*, 13*b*, 13*c*, 13*d*, 13*e*, 13*f* . . . microphone
14, 14*a*, 14*b*, 14*c*, 14*d*, 14*e*, 14*f* . . . directional speaker
15, 15*a*, 15*b*, 15*c*, 15*d*, 15*e*, 15*f* . . . changeover switch
16 . . . guidance speaker
17 . . . display device
20 . . . first processor
21 . . . first memory
22 . . . first communication device
23 . . . usage schedule information
24 . . . support program
25 . . . usage management unit
26 . . . seat determination unit
27 . . . presentation unit
28 . . . sound control unit
40 . . . second processor
41 . . . second memory
42 . . . second communication device
43 . . . matching program
44 . . . schedule information collection unit
45 . . . mobile entity information collection unit
46 . . . allocation unit
Sa, Sb, Sc . . . indoor region
U . . . participant

What is claimed is:

1. A conference support system comprising a first processor and a second processor,
 the second processor being configured to collect conference schedule information including identification information of a scheduled online conference and information about conference time zone, wherein the scheduled online conference is participated by a participant who wishes to participate in the online conference from a mobile entity,
 the first processor being configured to:
 determine, based on the conference schedule information, a seat arrangement for the participant in the mobile entity that the participant boards; and
 present the determined seat arrangement to the participant when the participant boards the mobile entity,
 the second processor is configured to:

collect mobile entity information including information about seating capacity, seat layout, and seat availability, of each of mobile entities available for use by the participants; and allocate, to each of the participants, a mobile entity that is used when each of the participants participates in the online conference, wherein the second processor calculates the number of participants who participate in the same online conference based on the conference schedule information, and allocates a mobile entity to each of the participants who participate in the same online conference based on both the calculated number of participants and the seating capacity, seat layout, or seat availability of each of the mobile entities as indicated in the mobile entity information, the mobile entity being to be used when the participant participates in the same online conference.

2. The conference support system according to claim 1, wherein the first processor divides a compartment of the mobile entity into multiple indoor regions, based on the conference schedule information, and determines the seat arrangement so that participants who participate in the same online conference are seated in the same indoor region.

3. The conference support system according to claim 2, wherein the first processor determines the seat arrangement so that any non-participant who does not participate in any online conference is seated in the same indoor region.

4. The conference support system according to claim 2, further comprising:

one or more directional speakers provided in the compartment of the mobile entity, wherein the first processor is configured to control sound output from the directional speaker into the compartment, the first processor controls the sound output from the directional speaker to mute sound transmitted from one indoor region to other indoor regions, in the other indoor regions.

5. The conference support system according to claim 2, further comprising:

one or more directional speakers provided in the compartment of the mobile entity, wherein the first processor is configured to control sound output from the directional speaker into the compartment, the first processor controls the sound output from the directional speaker to mute, in the one indoor region, sound transmitted from the other indoor regions.

6. The conference support system according to claim 4, wherein the first processor controls sound output from the directional speaker to mute, in one indoor region, voice of a person sitting in one seat at a position of a person sitting in another seat, and/or mute voices of persons sitting in other seats at a position of a person sitting in one seat.

7. The conference support system according to claim 1, wherein the first processor presents the determined seat arrangement to the participant, with a speaker or a display device provided in the mobile entity.

* * * * *